United States Patent

Rao

Patent Number: 5,937,184
Date of Patent: Aug. 10, 1999

[54] SYNTHESIS OF APPLICATION-SPECIFIC SUBSYSTEMS BY SELECTIVE MIGRATION

[75] Inventor: Sreenivasa Devarakonda Rao, Dutchess County, N.Y.

[73] Assignee: International Business Machines Corporation, Armonk, N.Y.

[21] Appl. No.: 08/627,715

[22] Filed: Apr. 1, 1996

[51] Int. Cl.⁶ ............................................. G06F 9/44
[52] U.S. Cl. ................................................ 395/500.41
[58] Field of Search .......................... 395/500, 705, 395/674; 364/488, 489, 490, 491

[56] References Cited

U.S. PATENT DOCUMENTS

| | | |
|---|---|---|
| 5,005,122 | 4/1991 | Griffin et al. . |
| 5,329,619 | 7/1994 | Pagé et al. . |
| 5,341,477 | 8/1994 | Pitkin et al. . |
| 5,341,499 | 8/1994 | Doragh . |
| 5,377,350 | 12/1994 | Skinner . |
| 5,392,400 | 2/1995 | Berkowitz et al. . |
| 5,404,523 | 4/1995 | DellaFera et al. . |

*Primary Examiner*—Kevin J. Teska
*Assistant Examiner*—Dan Fiul
*Attorney, Agent, or Firm*—Whitham, Curtis & Whitham; Jay Anderson

[57] ABSTRACT

A synthesis method allows a designer to choose hardware or software for critical and noncritical paths in an application specific subsystem implementation. From an abstract specification, a method is synthesized choosing the most efficient paths, hardware or software, in terms of performance and cost. In its design, a software path may be chosen when most efficient and a hardware path when most efficient, creating a hybrid design.

5 Claims, 3 Drawing Sheets

SYNTHESIS OF APPLICATION-SPECIFIC SUBSYSTEMS BY SELECTIVE MIGRATION

BACKGROUND OF THE INVENTION

1. Field of the Invention

The present invention generally relates to systems design and, more particularly, to high-level synthesis of application-specific subsystems with consideration given to system-wide resource availability, so as to determine whether the most effective implementation is in hardware or software, and then to synthesize the logic into hardware or software as determined to be most optimal.

2. Background Description

Most digital systems can be abstracted to a simple model in which a core programmable processor executes software programs, while application-specific functions that are either performance critical or cannot be implemented in software are performed by a set of Application Specific Integrated Circuits (ASICs). In addition, busses provide communication channels and memory elements provide storage. For example, in a typical signal processing system, the core processor is usually a general purpose Digital Signal Processing (DSP) chip, like the TMS320xx or ATT-DSP32, while specialized functions like compression/decompression and high-throughput filtering are performed in hardware by the ASICS.

It is usually the case that most of the functions implemented in hardware can be performed in software as well. For example, consider a multiply-accumulate function or an Finite duration Impulse Response (FIR) filtering function. The reason hardware is chosen is simply to satisfy the performance constraints imposed on the system. While software offers lower cost and faster turn-around, hardware offers better performance at higher cost. In synthesis parlance, cost is usually a measure of area, of the chip or the board.

With the emerging trend towards systems-on-a-chip, it becomes all the more important to minimize cost while meeting performance constraints. A basic necessity for obtaining such optimized implementations is to partition the system description into hardware and software components in an intelligent way. This problem of hardware-software partitioning is not yet well understood and is an emerging subject of research in the high-level synthesis community.

Typically, the synthesis of an application-specific function like filtering starts with a Hardware Description Language (HDL) description of the function, which is then translated into an intermediate form. Hardware is allocated to the individual operation in the function, and resource sharing is performed as much as possible. After several other steps, a chip implementing the function in question will be achieved. It is important to note that this chip is being used in a system, yet none of the hardware and software resources available outside its immediate boundaries have been considered in synthesizing it. When all the components of a system are integrated on a chip, it becomes more feasible and very often necessary to consider such global resource sharing aimed at reducing the cost.

In the past, hardware-software partitioning was usually done empirically. Even then it has not been applied as a technique for better high-level synthesis. Designers make these decisions manually based on their expertise.

SUMMARY OF THE INVENTION

It is therefore an object of the present invention to provide a method which exploits the system's perspective in the process of synthesizing an application-specific function.

It is also an object to provide a synthesis methodology that takes a global perspective in synthesizing each individual function in the system and is different from traditional high-level synthesis or system synthesis approaches.

According to the invention, there is provided a method for high-level synthesis that is global in its approach. The invention provides a definition of a hybrid design space or a design space for heterogeneous implementations and its use as an alternative to hardware-software partitioning of system designs. When synthesizing an application-specific function, other resources (i.e., hardware units and software platforms) that are available are exploited to minimize the cost of the function while at the same time maximizing its performance. The practice of the invention begins by making the assumption that there is a generic processor executing software programs available to us. Based on this assumption, an analysis is made to see if some of the functionality we are trying to synthesize in hardware could be transferred to software executing on the processor, therefore obtaining a reduction in cost. Since this model is generic, extending the initial assumption to multiple hardware resources that are available is straight forward. The problem then becomes one of partitioning a given high-level function into software and hardware portions. The need to actually do the partitioning is circumvented using a concept of "hybrid design space" and its exploration based on heuristic approach.

The invention thus provides a method for determining a mix of hardware and software for implementing an information processing function based on design constraints. A control data flow graph with a path associated with each sub-function capable of being implemented in either software or hardware is first provided. A cost is assigned for implementing each path in either software or hardware. Based on the cost assignment, an all-software implementation cost and an all-hardware implementation cost are determined. At least one hybrid functional implementation cost is determined by

- identifying each path as critical or non-critical,
- allocating non-critical paths to software implementation and critical paths to hardware implementation, and
- adding the path costs plus integration costs.

A function design decision space is constructed with the estimates, and then the functional implementation that best suits the design constraints is chosen.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The preferred embodiment of the invention is implemented using the Verilog synthesis tools available to designers of very large scale integrated (VLSI) circuits, such as complex ASICs. Verilog XL is a licensed software program from Cadence Corporation. General information on Verilog coding and the Verilog XL simulation tool is provided in Verilog XL Reference, Ver. 1.7, Cadence On-line Reference library 9303, Cadence Corporation, and Verilog Hardware Description Language Reference Manual, Open Verilog International, 1991.

Figure 1:
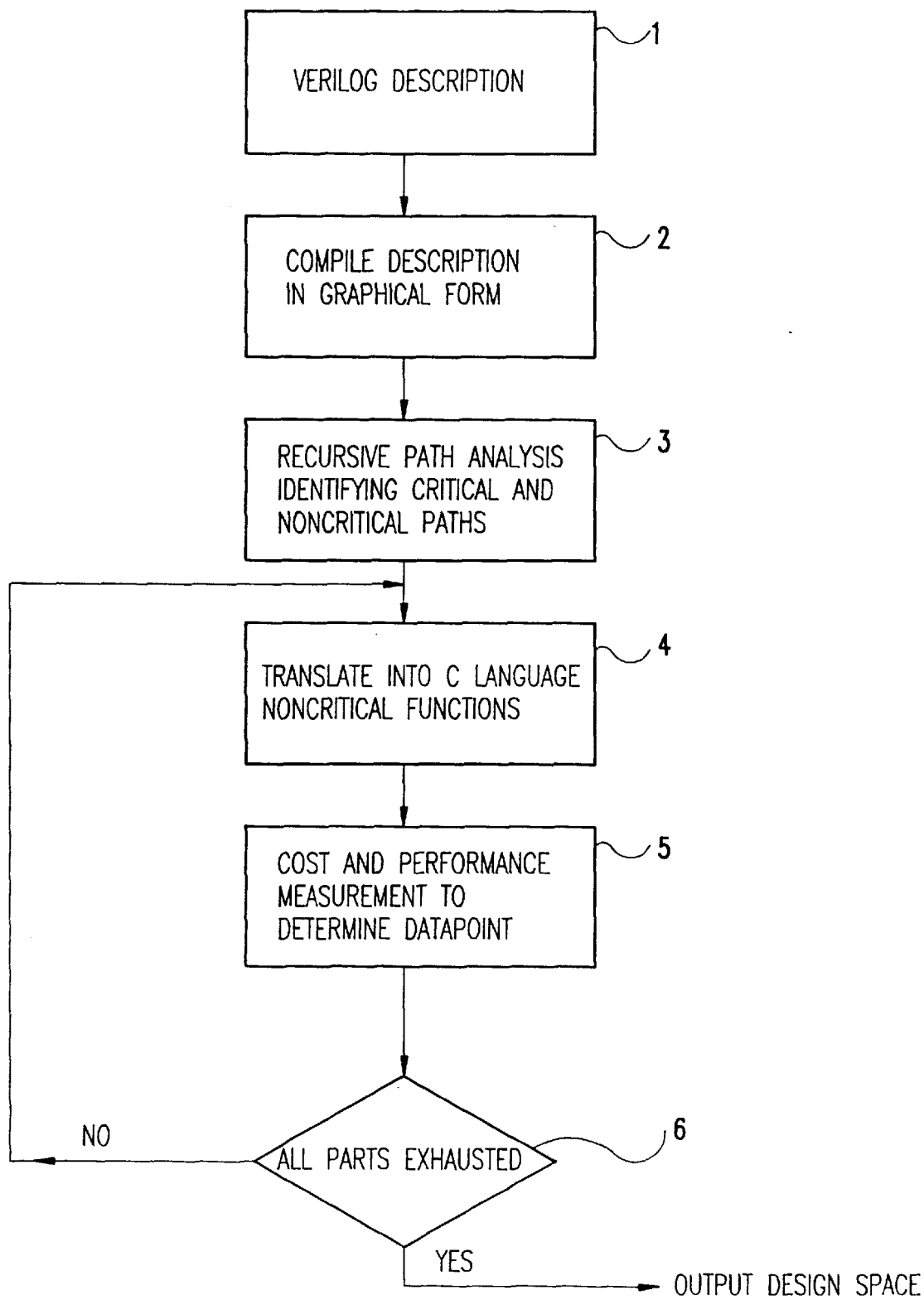
FIG. 1 is a flow chart of the method of the present invention.

Referring now to the drawings, and more particularly to FIG. 1, there is shown a flow chart of the method of the present invention. In the first step, shown in block 1, a Verilog description of the application specific function being synthesized is accepted. In block 2, the description is compiled into a graphical intermediate form, known as the control-data flow graph or CDFG. This provides an intermediate representation of the circuit. This step has typically been performed using a software tool known as High level IBM Synthesis (HIS), which works off of the hardware description language, Verilog. Information on HIS can be found in "High-level Synthesis in an Industrial Environment", IBM Journal of Research and Development, January/March 1995.

Next, as shown in block 3, recursive path analysis is performed to identify various critical and noncritical paths in the design. This is not as straight forward a task as simply traversing the graph and determining the longest path. Complications are introduced by the fact that the execution times of each operation have to be considered in order to really determine the critical path. Each path is a logical flow of operations in a graphical representation of the information processing function being implemented. A path can consist of sub-paths. When a critical path is first identified, other paths are left out which can be analyzed for criticality and noncriticality. Once the system is analyzed, the paths are migrated one at a time to software to get the points in the design space. Each of the noncritical paths is migrated out of the description, and the cost/performance of the rest is estimated.

Figure 2:
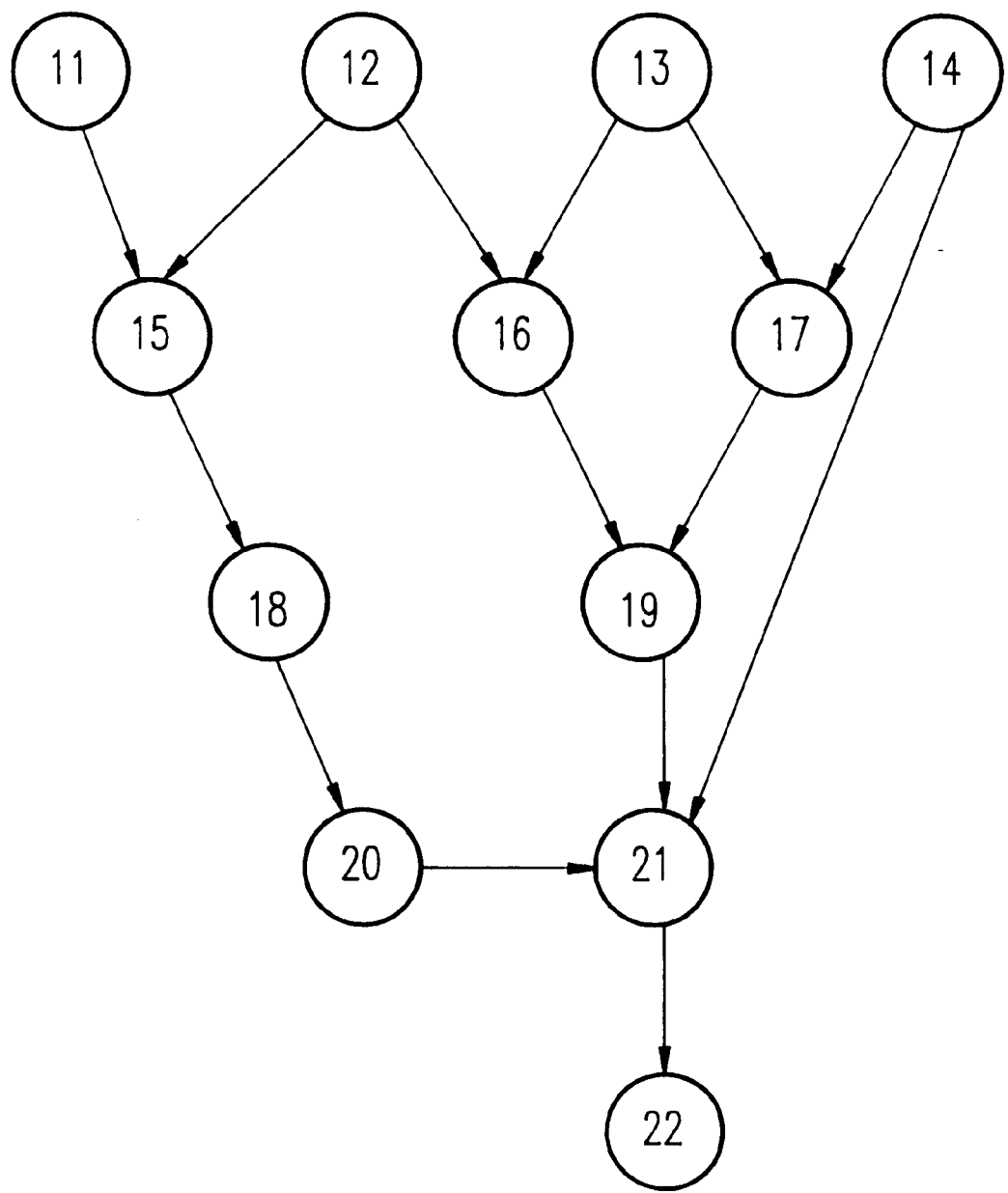
FIG. 2 is a representation of a hypothetical digital system specification.

The step shown in block 3 is further explained with reference to FIG. 2. FIG. 2 graphically illustrates an algorithm identifying a critical path. The critical path is defined by nodes 11, 15, 18, 20, 21, and 22. Since this is the critical path, it will be chosen for hardware implementation, and the rest of the graph consisting of nodes 12, 13, 14, 16, 17, and 19 will now be considered. In this subgraph, the critical path is made up of nodes 12, 16, 19, and 21. This path is now chosen for implementation in hardware, and the rest of the graph is further analyzed this way. Thus, we are selectively choosing paths in smaller and smaller subgraphs and implementing them in a hybrid fashion to facilitate the evaluation of their area and delay times.

Returning to the flow diagram of FIG. 1, in the next step, the data point corresponding to a hybrid implementation on the cost-performance curve (i.e., an implementation in which part of the function is in hardware and another part in software) is obtained, by first, translating into C language the Verilog description of the functionality corresponding to the chosen path and obtaining the assembly instructions for the target processor (used as the core processor in the system), as shown in block 4. Then, in block 5, the performance of the path implemented in software is evaluated by counting the number of clock cycles required for the instructions therein (a process that can be easily automated) and is combined with the performance of the hardware portion to obtain the data-point on the cost performance curve. The measurement of software performance is accomplished by counting the number of cycles. Hardware performance is estimated. In determining cost, the software cost is ignored because it represents a very small percentage of the total cost. The assembly code needs to account for the communication overhead between the software thread and its hardware master through the use of extra variable and instructions. The data point corresponding the complete software implementation is obtained by translating the Verilog specification into C and the number of cycles required for it are evaluated as described above. Equivalently, a simple synthesis run gives the data point for an all hardware implementation.

Finally, as shown is decision block 6, the method determines if all parts are exhausted. If all parts are exhausted, a design space is output; otherwise, the program returns to step 4 to complete the processing.

As mentioned, a cost is not specifically associated with the software implementation. This seems reasonable because software running on a generic processor usually has a cost that is negligible compared to the cost of hardware. However, this procedure can be refined to include a factor of the cost incurred by the programmable core processor and any required peripherals for computing the software cost. In the inventive method, the various "data points" in the design space, which correspond to various possible implementations, are given and the designer can choose the one that is most suited to his requirements.

Design space is simply the name given to the space defined by all the possible alternatives available for implementing a function. For example, a simple function that has two additions in series can be implemented with one adder and multiplexers and latches as necessary, or with simply two distinct adders. Clearly, such implementations define a space which can be used for studying the cost in terms of area and performance trade-offs. To a first-order effect, higher cost usually implies better performance. Armed with the knowledge of such a design space, the designer can choose the kind of implementation that is best suited to meeting his cost and performance objectives. Ability to quickly generate and explore this space is therefore an important feature of a synthesis tool.

In the context of systems, the design space becomes more general, encompassing the possible hardware implementations, as well as the software and the mixed (part of the function in hardware and part in software) implementations. As explained earlier, a complete software implementation is cheap but slow, whereas a complete hardware implementation is fast but expensive. A third approach would be to consider all the possibilities in between. If we could identify critical paths in the function description (based on say a graphical representation of the same), then a simple algorithm would be to implement the operation of the critical path in hardware (since it is fast) and migrate the rest of the operations into software. This procedure is made more efficient by identifying the local paths within the remaining paths, both locally critical and locally noncritical. Thus, a set of candidate paths can be chosen for either kind of implementation. Since paths represent a set of closely dependent operations, it makes sense to implement each path in one medium, either hardware or software, so that overheads like communication cost can be brought down. Such path-based migration of the function's operations is a distinguishing feature of this approach, and draws upon the path-based algorithms already developed.

The present invention deals with concepts of systems design and how high-level synthesis can be improved to exploit those concepts. Evidently, this procedure is useful only to system-level designers and makes sense in an environment that has a fairly formal system design framework in place.

Figure 3:
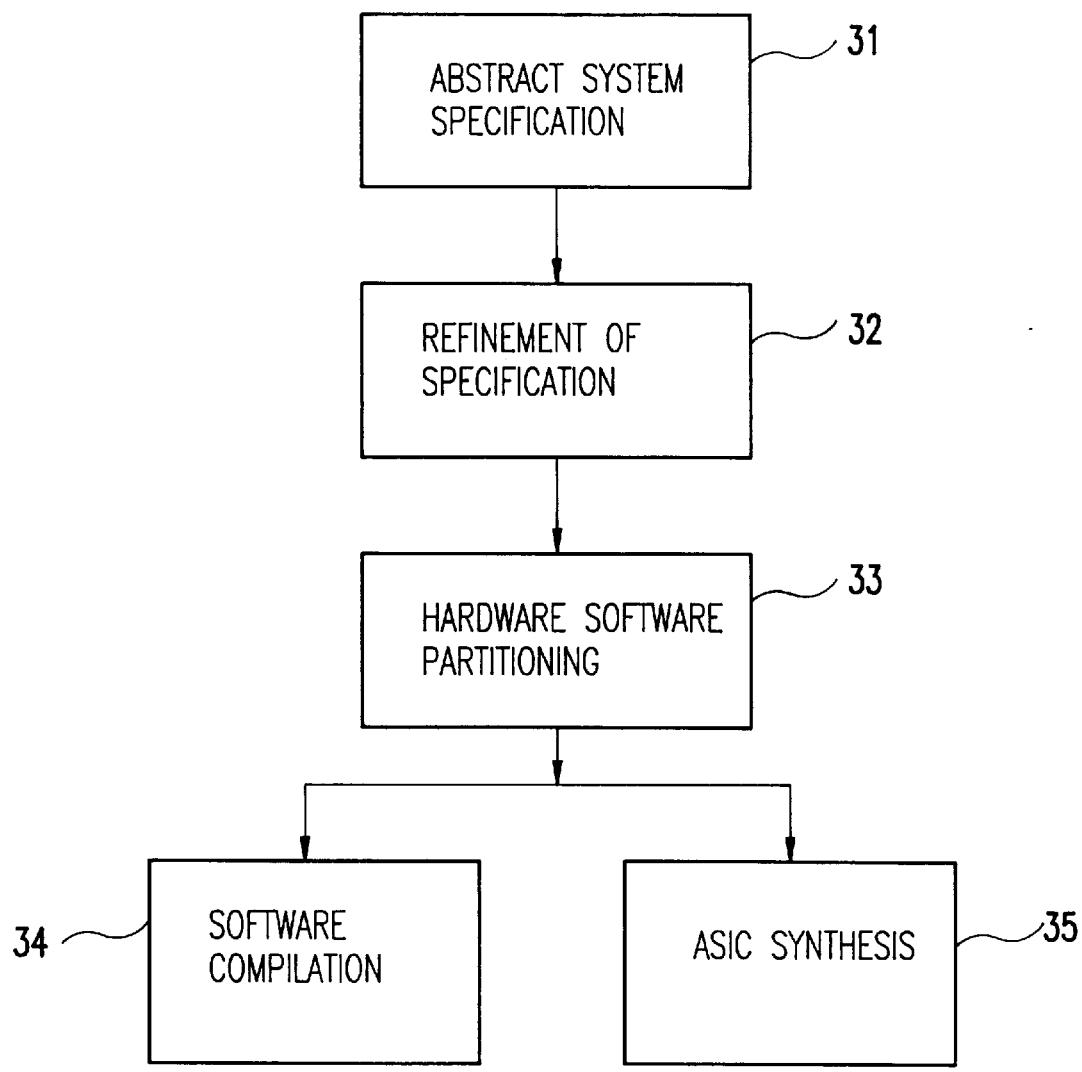
FIG. 3 is a flow chart of a synthesis of a design.

The use of the present invention as part of a general process is shown is FIG. 3. First, in block 31, an abstract system specification is developed. This simply identifies what is to be produced, for example a computer chip for a wristwatch. In the next step, shown in block 32, the specification is refined. This includes memory, functions, and input/output. In the case of a wristwatch the functions could include, time, date, and a.m. or p.m. The third step, shown in block 33, is to perform hardware-software partitioning in the method of the disclosed invention. The partitioning puts out a software that needs to be compiled as shown in block 34 and ASIC description that needs to be synthesized as shown in block 35.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A computer implemented method for determining a mix of hardware and software for implementing an information processing function based on design constraints, comprising the steps of:

generating a control data flow graph with a path associated with each subfunction which is capable of being implemented in either software or hardware;

performing a recursive path analysis of each path of the data flow graph;

assigning a cost for implementing each path in hardware, software and a combination of hardware and software, said step of assigning a cost including estimating an all-hardware functional implementation cost, measuring an all-software functional implementation cost, and generating at least one hybrid functional implementation cost based on a combination of hardware and software functional implementation;

constructing a functional design decision space with the assigned costs for an all-hardware implementation, an all-software implementation and at least one hybrid functional implementation; and choosing an implementation that best suits design constraints as a function of the assigned costs.

2. The computer implemented method recited in claim 1 wherein said step of generating at least one hybrid functional implementation cost comprises the steps of:

identifying each path as critical or noncritical;

allocating noncritical paths to software implementation and critical paths to hardware implementation; and adding path costs plus integration costs.

3. The computer implemented method recited in claim 2 wherein hardware costs are computed as a function of chip area.

4. The computer implemented method recited in claim 3 wherein software costs are ignored as negligible.

5. A computer implemented method of partitioning an application specific subsystem into software and hardware portions in order to minimize cost of implementation while maximizing performance of an implementation of the application specific subsystem comprising the steps of:

inputting a conventional high level synthesis paradigm providing a high level functional definition of the application specific subsystem;

generating a control data flow graph with a path associated with each subfunction which is capable of being implemented in either software or hardware;

performing a recursive path analysis of each path of the data flow graph and identifying each path as critical or noncritical;

allocating noncritical paths to software implementation and critical paths to hardware implementation;

translating noncritical paths to software and compiling the translated software; and synthesizing the critical paths in application specific integrated circuits.

* * * * *